United States Patent
Willett (10) Patent No.: US 7,985,944 B2
(45) Date of Patent: Jul. 26, 2011

(54) STEAMING DEVICE FOR BAKER'S OVENS

(75) Inventor: Paul Eaton Willett, Whiteside (AU)

(73) Assignee: Moffat Pty Ltd, Mulgrave (AU)

( * ) Notice: Subject to any disclaimer, the term of this patent is extended or adjusted under 35 U.S.C. 154(b) by 899 days.

(21) Appl. No.: 10/567,417

(22) PCT Filed: Aug. 6, 2004

(86) PCT No.: PCT/AU2004/001049
§ 371 (c)(1),
(2), (4) Date: Apr. 4, 2008

(87) PCT Pub. No.: WO2005/013697
PCT Pub. Date: Feb. 17, 2005

(65) Prior Publication Data
US 2008/0257878 A1  Oct. 23, 2008

(30) Foreign Application Priority Data
Aug. 7, 2003  (AU) ................ 2003904149

(51) Int. Cl.
*A21B 1/00* (2006.01)
*F22B 1/30* (2006.01)

(52) U.S. Cl. ........ 219/401; 219/201; 219/400; 219/403; 392/325; 392/394; 392/397; 392/398; 126/21 A; 126/369; 126/348; 99/467; 99/468; 99/473; 99/474

(58) Field of Classification Search ............... 219/401, 219/400, 403, 201; 392/325, 394, 397; 99/467–8, 99/473–4; 126/21 A, 369, 348
See application file for complete search history.

(56) References Cited

U.S. PATENT DOCUMENTS
4,724,824 A   2/1988   McCoy

FOREIGN PATENT DOCUMENTS

| AU | 38285/93 A | 11/1993 |
|---|---|---|
| AU | 38285/93 | * 11/1994 |
| AU | 12348/95 A | 5/1995 |
| AU | 28450/95 A | 11/1995 |
| DE | 100 44 466 A1 | 3/2002 |
| SU | 1158140 A1 | 5/1985 |

* cited by examiner

*Primary Examiner* — Shawntina Fuqua
(74) *Attorney, Agent, or Firm* — Christensen O'Connor Johnson Kindness PLLC (57) ABSTRACT

A steaming device (50) for a baker's oven including a steam generation chamber (55), located adjacent at least one heating element (25, 26) in an oven compartment of the baker's oven, the steam generation chamber (55) being closed at one end and having at least one steam outlet at or adjacent the other end; at least one heat sink member (57) in the steam generation chamber (55) to provide a heat source to convert steaming water introduced into the steam generation chamber 55) into steam; and a steaming water pipe (40) having at least one nozzle (41) operable to direct water into the steam generation chamber (55), the steaming water being convertible into steam within the steam generation chamber (55) and releasable to the oven compartment through the at least one steam outlet.

19 Claims, 6 Drawing Sheets

STEAMING DEVICE FOR BAKER'S OVENS

FIELD OF THE INVENTION

The invention relates to a steaming device and in particular to internal steaming devices for baker's ovens. The invention is particularly suitable for, but not limited to, rotary bakers' ovens; but can be readily adapted to conventional bakers' ovens.

BACKGROUND OF THE INVENTION

A well known and widely used baker's oven comprises a number of superimposed oven compartments with individual oven doors at the front. Each compartment generally includes two turntables onto which bakery goods including bread pins are loaded.

The oven compartments are heated by electric heating elements in the bottom and top of the compartments. The heating elements are formed as single heating units comprising a number of parallel arms connected in series by U-shaped elements. The parallel arms extend from the oven door to the rear of the compartment and are spaced across the width of the oven.

The controlled introduction of steam into the oven compartment of bakers' ovens is well known. Steam can be used to create glazed buns, "split" crusts or bakery products such as bread and rolls One means of introducing steam into bakers' ovens is to use external steam generators and introduce the steam into the oven through a conduit connecting the steam generator to the oven. This method of steam generation requires an additional steam generator and is thought to be inefficient, not only in terms of the overall heat requirements of the baking and steam generation process but an external steam generator uses up valuable bakery space.

In recent years to avoid the need for external steam generators, water has been sprayed into the oven compartments for conversion into steam. This creates problems for designers and manufactures of bakers' ovens in that the heat energy required to convert water into steam must not be so large as to cause the internal temperature in the compartments to drop more than say 5-10° C., or the quality of the finished baked products may be adversely affected.

Secondly, all of the water must be converted into fine steam before it comes into contact with the bakery products, as impingement of even very small water droplets on the surface of the bakery products adversely affects the surface appearance thereof.

A further complication has arisen with the adoption of ceramic surfaces, e.g. ceramic tiles, on the oven turntables on which the products are baked. If the steam is sprayed directly at the ceramic surfaces, they will absorb the steam and the quantity of steam available to the bakery products is minimised.

Australian Patents Nos. 666365, 666633 and 669838, all in the name of APV Australian Pty Ltd, all disclose an internal steaming assembly for a bakers oven in which the parallel rods of the lower heating element in the oven compartments are positioned in the vicinity of a ballast bar. Water from a water supply pipe is sprayed onto the heated ballast bar at the front of the oven compartment and the resulting generated steam left to circulate in the oven compartment. Apart from a plate over the section of the ballast bar adjacent the water pipe to prevent splashing, the ballast bar is not covered and is exposed to debris such as product overflow falling from the rotating turntables, onto the hot heating rods. This debris bakes onto the heating rods and ballast bars and must be regularly cleaned from the rods and ballast bars for heating efficiency and product quality reasons.

SUMMARY OF THE INVENTION

In one aspect, the present invention provides a steaming device for a baker's oven including:

a covered steam generation chamber, located adjacent at least one heating element in an oven compartment of the baker's oven, the covered steam generation chamber being closed at one end and having at least one steam outlet at or adjacent the other end;

at least one heat sink member in the covered steam generation chamber to provide a heat source to convert steaming water introduced into the covered steam generation chamber into steam; and a steaming water pipe having at least one nozzle operable to direct water into the covered steam generation chamber, the steaming water being convertible into steam within the covered steam generation chamber and releasable to the oven compartment through the at least one steam outlet.

In a preferred form of the invention, the covered steam generation chamber is an elongate chamber adjacent to at least one elongate heating chamber containing at least one heating element. The steam generation chamber is separated from the at least one heating chamber by a dividing wall.

The heating chamber may have one or more heat outlets to enable the transfer of the heat generated by the heating element(s) to the oven compartment.

Preferably, the or each heat sink member is a strip of bar of metal, eg., mild steel, having a thermal mass sufficient to maintain the temperature within the oven compartment within a prescribed temperature range when the steaming water is introduced into the steaming compartment and converted to steam.

In the operation of the steaming apparatus of the invention, the heat sink members are heated by heat transferred from the heating rods in the heating chamber to the steam chamber. The water for steaming is introduced into the steam chamber by a water pipe, preferably located at or adjacent the closed end of the steam chamber. The water pipe is preferably positioned towards the front of the oven compartment and extends transversely of the steaming chamber. The steaming water enters the steaming chamber at or adjacent the closed end and the water and generated steam progress down the steaming chamber and exit the steam chamber at the at least one steam outlet. Generally all of the steaming water is converted to steam by heat from the ballast bar before the water has travelled three quarters of the length of the steaming chamber and preferably within one half to three quarters of the length of the heating element.

The steam element preferably directs the steam into the oven compartment into a zone (or zones) at the rear of the oven and away from direct contact with an ceramic surfaces. This zone or zones may be above the bakery products.

As steam is only needed in the production of about 20% of a typical bakery's products, the oven needs to be used in non steaming mode most of the time. Accordingly, ovens provided with internal steaming devices must be able to allow heat to dissipate freely and evenly from the heating rods throughout the oven.

Accordingly it is preferable that the heating chamber be provided with a plurality of heating outlets along the length of the heating chamber. The plurality of heating outlets are preferably provided in the side of the heating chamber to prevent the outlets being blocked by product debris falling onto the heating chamber.

In a second aspect, the present invention provides a baker's oven having at least one oven compartment, the oven compartment being heated by a plurality of parallel heating rods arranged across the width of the oven compartment, at least one parallel heating section of the heating rod being provided with a steaming device comprising a covered steam generation chamber adjacent the at least one heating element, the covered steam generation chamber being closed at one end and having at least one steam outlet at or adjacent the other end; the covered steam generation chamber being provided with at least one heat sink member to provide a heat source to convert steaming water introduced into the covered steam generation chamber into steam; and a steaming water pipe having at least one nozzle operable to direct water into the covered steam generation chamber, the steaming water being converted into steam within the steam generation chamber and being released to the oven compartment through the at least one steam outlet.

Preferably, the baker's oven is of the rotary type, having one or two oven compartments provided on one or more, eg., three, four or five levels.

In a third aspect, the present invention resides in a steaming method for bakers' ovens including the steps of:

providing a covered steam generation chamber adjacent at least one heating element in an oven compartment of a baker's oven, the steam generation chamber being closed at one end and having at least one steam outlet at or adjacent the other end;

introducing a controlled volume of water into the steam generation chamber at or adjacent the one end;

converting the water into steam within the steam generation chamber; and releasing the steam from the covered steam generation chamber through the steam outlet(s) into the oven compartment.

In a preferred form of the invention, the steam outlet is towards the rear of the compartment away from any ceramic surfaces in the oven and the steaming water is introduced through a water pipe which extends transversely of the covered steam generation chamber. More than one steam generation chamber may be provided in the oven adjacent a respective heating element, preferably a parallel section heating element which extends from the vicinity of the front of the oven towards the rear.

BRIEF DESCRIPTION OF THE DRAWINGS AND PREFERRED EMBODIMENT

To enable the invention to be fully understood, preferred embodiments will now be described with reference to the accompanying drawings in which.

DETAILED DESCRIPTION OF THE PREFERRED EMBODIMENTS

Figure 1:
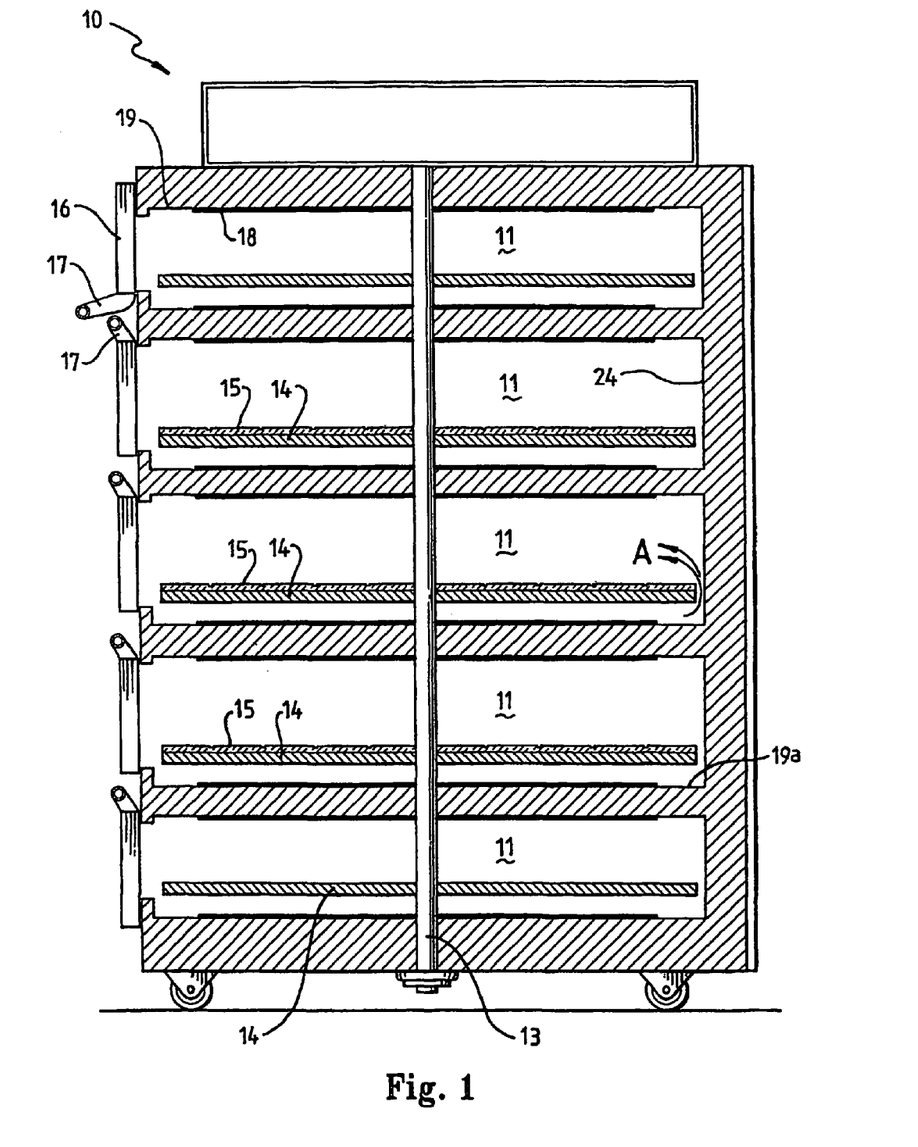
FIG. 1 is a sectional side view of a five-level rotary baker's oven in accordance with the present invention.
Figure 2:
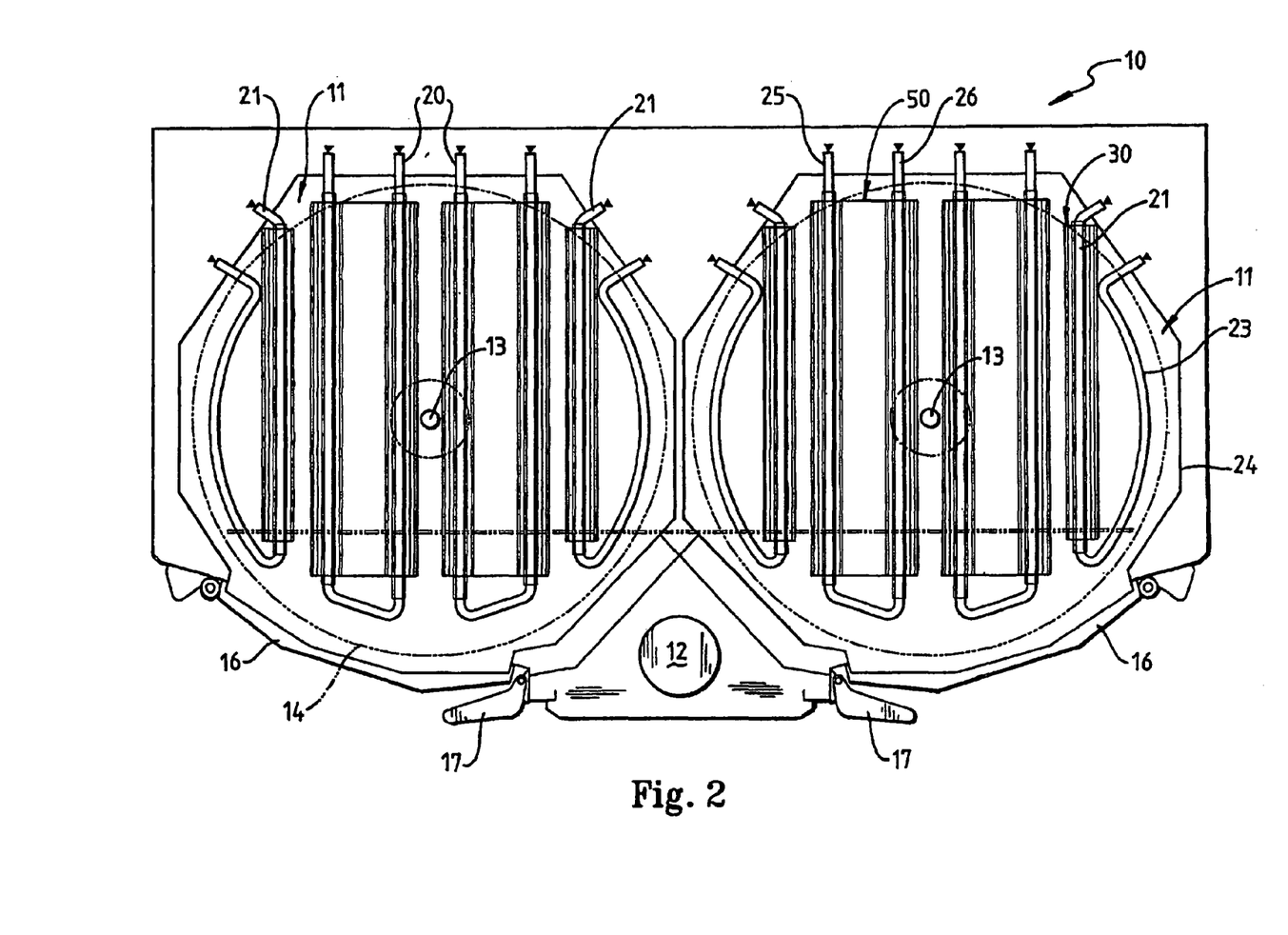
FIG. 2 is a sectional plan view of one of the levels showing the arrangement of the heating elements and the associated steaming apparatus.

Referring to FIGS. 1 and 2, the baker's oven is a rotary oven 10 of the type sold under the registered trade mark "ROTEL". In the embodiment illustrated, the oven has five lengths with two oven compartments 11 on each level. A drive motor 12 is operably connected to a pair of vertical shafts 13 on which are mounted turntables 14 which may incorporate optional ceramic "tiles" 15 on which the bakery products (not shown) are cooked.

Each oven compartment 11 has an oven door 16 operably openable and closable by a handle 17.

Each oven compartment 11 has at least a pair of top heating elements 18 mounted to the under side of the top wall 19 of the oven compartment 11. As shown in more detail in FIG. 2, each oven compartment 11 has a pair of substantially U-shaped inner heating elements 20 and a pair of outer heating elements 21 mounted on the bottom wall 19a, where the pairs of outer elements 21 have a substantially straight element leg 22 connected to a curved element leg 23 which lies adjacent the peripheral walls 24 of the oven compartment 11. The operation of the heating elements 20, 21 is controlled by a computerised control system (not shown) which also controls the operation of the steaming apparatus to be hereinafter described.

Figure 3:
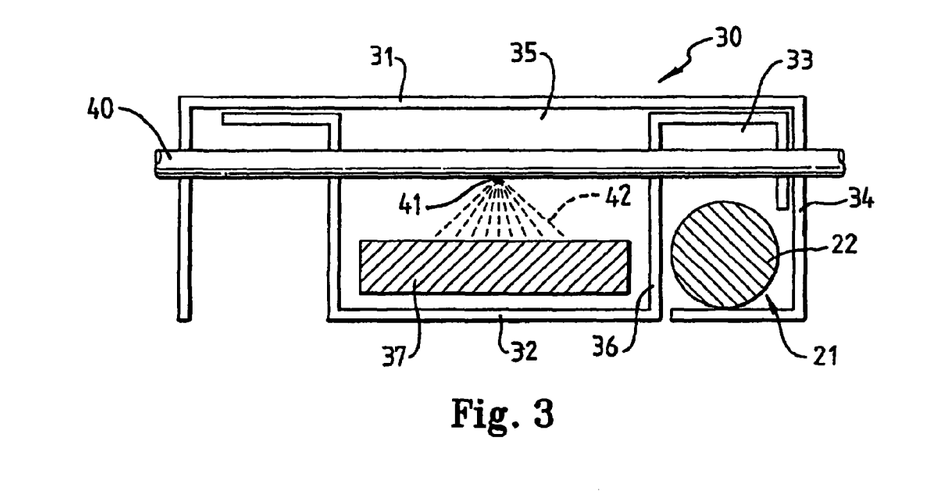
FIG. 3 is a sectional end view of the steaming apparatus for a single leg of a heating element.
Figure 4:
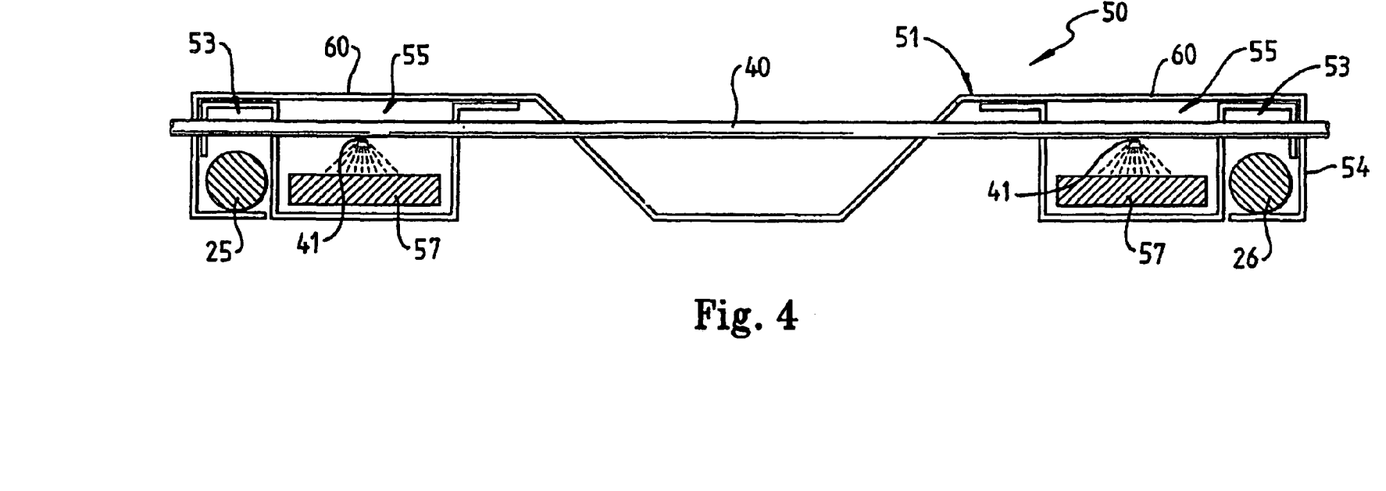
FIG. 4 is a similar view of both legs of a substantially U-shaped heating element.

As shown in more detail in FIG. 3, a respective steaming apparatus 30 is associated with the straight leg 22 of an outer heating element 21 and a respective steaming apparatus 50 is associated with both legs, 25, 26 of a U-shaped inner heating element 20.

Referring to FIG. 3, the steaming apparatus 30 has a housing formed from two folded blanks 31, 32, formed from stainless steel. to form an elongate heating chamber 33, in which is received most of the straight leg 22 of a heating element 21. Holes (not shown) in the outer wall 34 of the heating chamber 33 allow the transfer of heat from the heating element 21 to the oven compartment 11.

An elongate steam chamber 35 lies adjacent the heating chamber 33 and is separated therefrom by a dividing wall 36. The steaming chamber 35 is closed at one end and is provided with at least one slot or opening (not shown) at or adjacent the other end to provide a steam outlet for the steam generated within the steam chamber.

A heat sink member 37 comprising a strip of mild steel, is provided in the steam chamber 35. A water pipe 41 extends transversely of the steaming apparatus 30, adjacent closed end of the steam chamber 35, and is provided with at least one nozzle to direct the steaming water 42 onto the heat sink member 37 to enable the steaming water 52 to be converted to steam as it travels along the steam chamber 36 towards the steam outlet.

The dimension of the heat sink member 37 (and its material composition) are selected to ensure that the heat sink member 37 has sufficient thermal mass to covert all of the steaming water 42 into steam before it exits from the steam chamber 35; while minimizing any temperature drop within the oven compartment 11 to less than, say 5° C.-10° C. during the steaming step.

Generally, all the steaming water 42 is converted to steam by heat from the ballast bars 37 before the water has traveled three quarters of the length of the steaming chamber and preferably within one half to three quarters of the length of the steam chamber 35.

Figure 5:
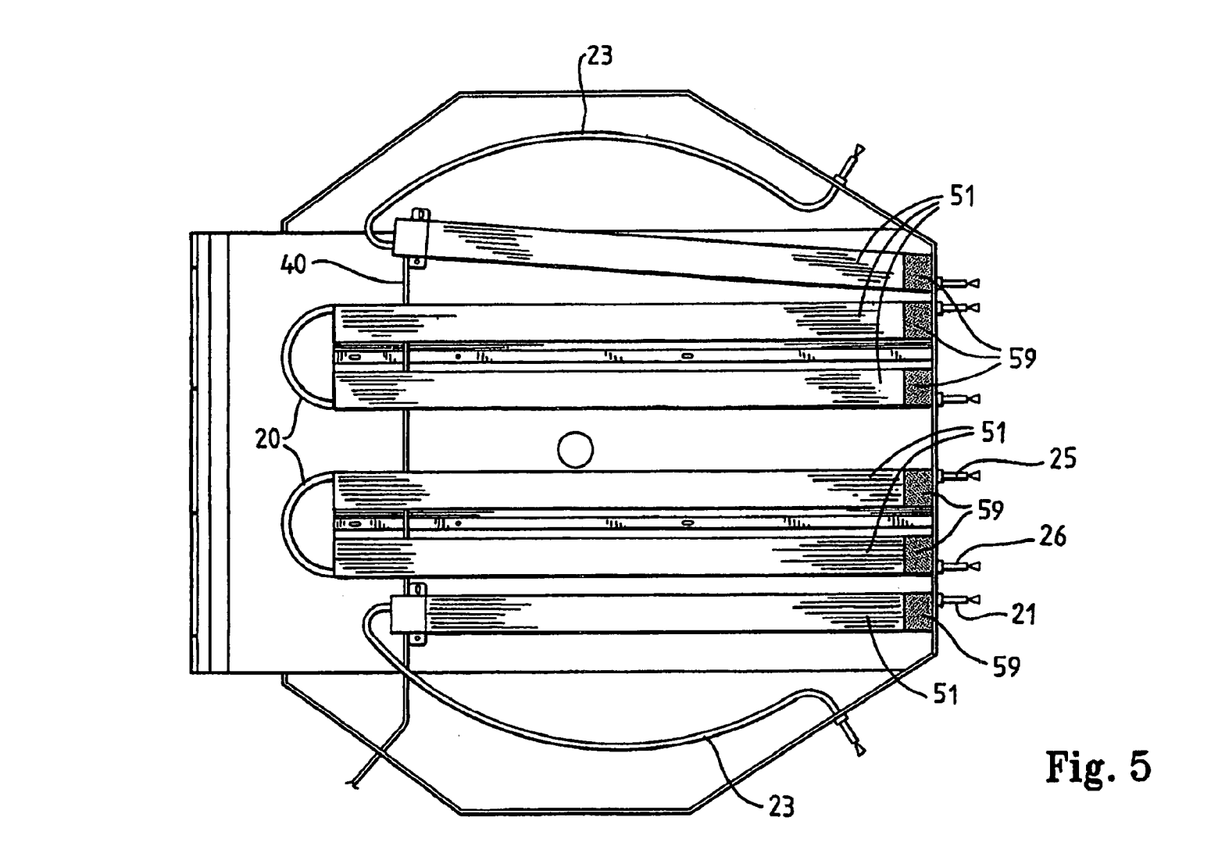
FIG. 5 is an embodiment of an alternative configuration to the invention shown in FIG. 2.

FIG. 5 is an alternative single oven arrangement in which the identical features are identified by similar numbers to that of FIG. 2.

Referring to FIGS. 3-7, the steaming. apparatus 50 for an inner heating element 20 is of substantially mirror-image about its central axis to form heating chambers 53 for the legs 35, 26 of the heating element 20, and respective steam chambers 55 with respective heat sinks 57. As shown, the water pipe 40 extends transversely to the steam chambers 55 to enable steaming water 42 to be sprayed by nozzles 41 onto the heat sink members 57.

Figure 6:
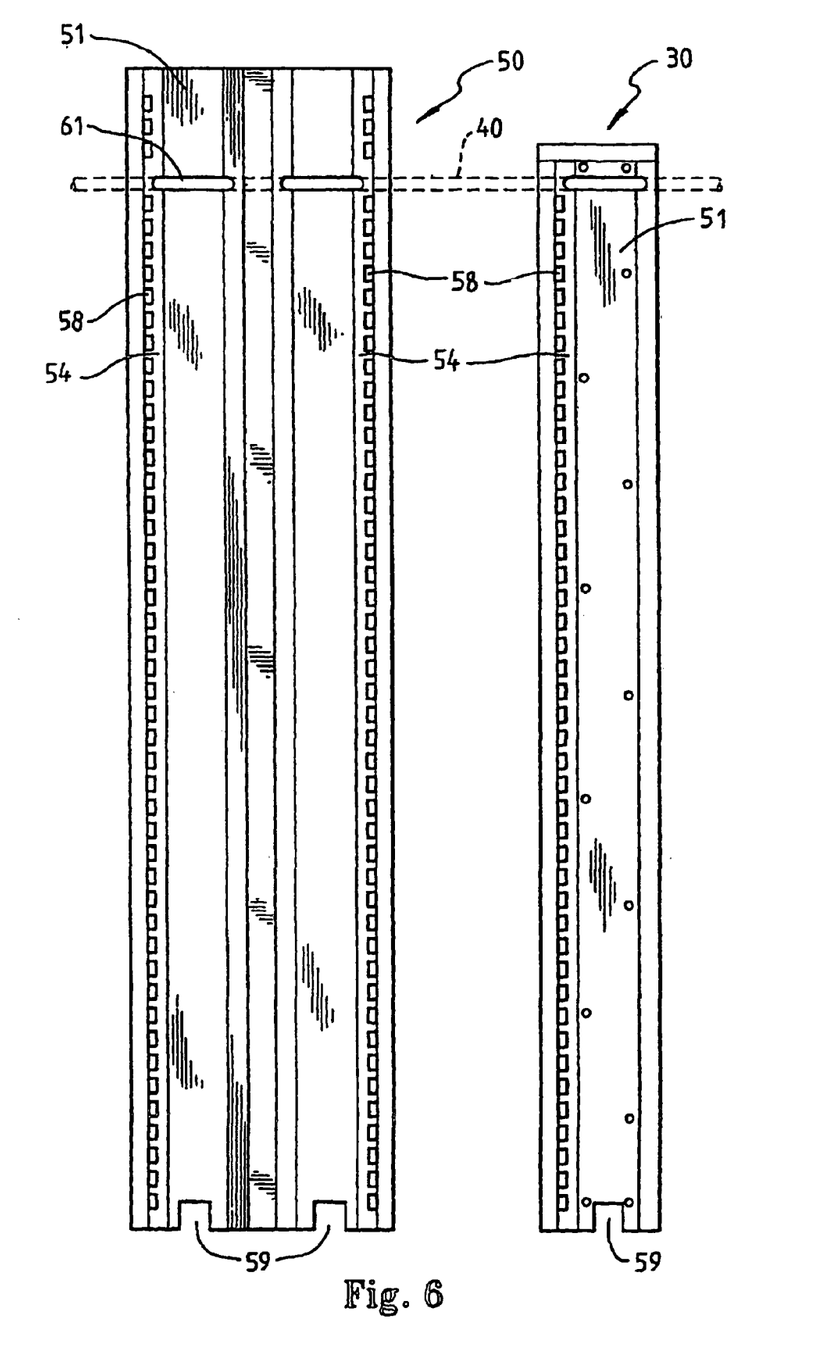
FIG. 6 is a top plan view of the top cover for a double and single heating element of the steaming apparatus of FIGS. 2 and 5.
Figure 7:
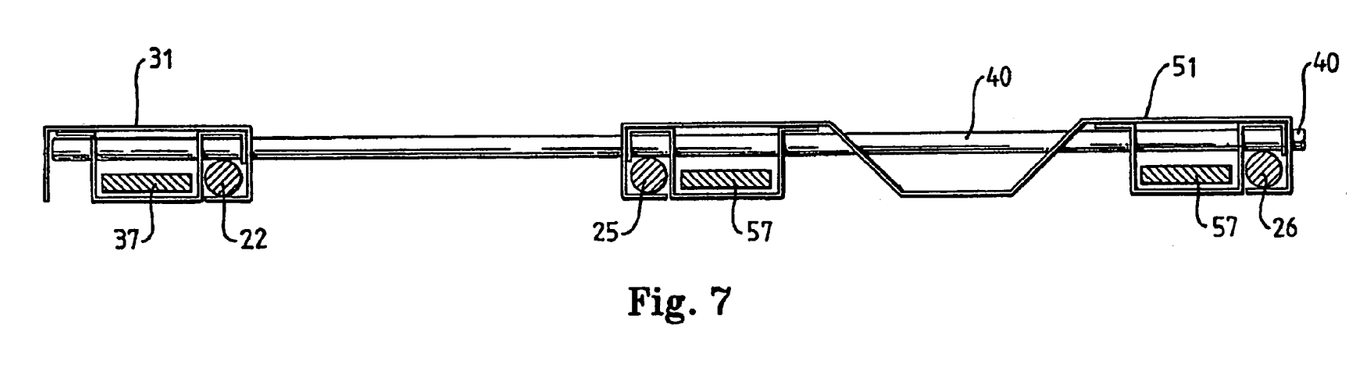
FIG. 7 is an end elevational view of a double and a single heating element of the steaming apparatus of FIGS. 2 and 5.

FIG. 6 is a top plan view of the top cover 51 of the steaming apparatus 50. The top cover 51 has a plurality of holes 58 in the outer side walls 54 to allow heat to be transferred from the legs 25, 26 of the heating element 20 to the oven compartment 11, and the steam outlets 59 are shown at the end of the steam chambers 55 formed in the top surfaces 60 spaced from the dosed ends adjacent the water pipe 40.

In operation, when steam is required, water is released from the waterpipe 40 through a nozzle 41 and slots 61 onto the ballast bar 37, 57. The steam generated passes down the length of the steam generation chamber to steam outlets 59.

As illustrated in FIG. 1, the steam released from the steam outlets 59 of the steaming apparatus 30, 50 is directed towards the rear portion of the peripheral wall 24 of the oven compartment 11, as indicated by the arrows A, so that the steam passes between the turntable 14 and the rear wall of the oven. The steam is thus directed into the portion of the oven compartment 11 generally above the bakery products and not directed into the ceramic tiles 15, supported by the turntable 14 on which the bakery products are cooked.

The steaming apparatus 30, 50 of the present invention provides a heat stable efficient steam generation device for the oven compartments 11 of the bakers oven 10. While a rotary baker's oven 10 has been illustrated, it will be readily apparent to the skilled address that the invention can be applied to conventional baker's ovens.

The invention claimed is:

1. A steaming device for a baker's oven including:
   a covered steam generation chamber, located adjacent at least one heating element in an oven compartment of the baker's oven, the covered steam generation chamber being closed at one end and having at least one steam outlet at or adjacent the other end;
   at least one heating element chamber covering the at least one heating element, the at least one heating element chamber separated from the covered steam generation chamber by a dividing wall;
   at least one heat sink member in the covered steam generation chamber to provide a heat source to convert steaming water introduced into the steam generation chamber into steam; and
   a steaming water pipe having at least one nozzle operable to direct water into the covered steam generation chamber, the steaming water being convertible into steam within the covered steam generation chamber and releasable to the oven compartment through the at least one steam outlet, wherein the covered steam generation chamber is an elongate chamber adjacent to at least one elongate heating chamber containing at least one heating element.

2. The steaming device of claim 1, wherein the steam generation chamber forms a elongate conduit from which steam exits at the steam outlet.

3. The steaming device of claim 1, wherein the heating chamber has one or more heat outlets to enable the transfer of heat from the at least one heating element to the oven compartment.

4. The steaming device of claim 3, wherein the one or more heating outlets are a plurality of outlets formed in the side of the heating chamber to provide direct access from the heating chamber to the oven chamber.

5. The steaming device of claim 1, wherein the at least one heat sink is a strip of metal bar having a thermal mass sufficient to maintain the temperature within the oven compartment within a prescribed temperature range.

6. A baker's oven having at least one oven compartment, the oven compartment being heated by a plurality of parallel heating sections arranged across the width of the oven compartment, at least one parallel heating section of the heating rod being provided with a steaming device comprising a covered steam generation chamber adjacent the at least one parallel heating section, and at least one heating element chamber covering the at least one parallel heating source, the at least one heating element chamber separated from the covered steam generation chamber by a dividing wall, the covered steam generation chamber being closed at one end and having at least one steam outlet at or adjacent the other end, the covered steam generation chamber being provided with at least one heat sink member to provide a heat source to convert steaming water introduced into the steam generation chamber into steam and a steam water pipe having at least one nozzle operable to direct water into the covered steam generation chamber, the steaming water being converted into steam within the steam generation chamber and being released to the oven compartment through the at least one steam outlet.

7. The baker's oven of claim 1, wherein the covered steam generation chamber is an elongate chamber adjacent to at least one elongate heating chamber containing at least one heating element.

8. The baker's oven of claim 1, wherein the steam generation chamber is separated from the at least one heating chamber by a dividing wall.

9. The baker's oven of claim 1, wherein the steam generation chamber forms a elongate conduit from which steam exits at the steam outlet.

10. The baker's oven of claim 1, wherein the heating chamber has one or more heat outlets to enable the transfer of heat from the at least one heating element to the oven compartment.

11. The baker's oven of claim 3, wherein the one or more heating outlets are a plurality of outlets formed in the side of the heating chamber to provide direct access from the heating chamber to the oven chamber.

12. The baker's oven of claim 1, wherein the at least one heat sink is a strip of metal bar having a thermal mass sufficient to maintain the temperature within the oven compartment within a prescribed temperature range.

13. A method for generating steam within a baker's oven including the steps of:
   providing a covered steam generation chamber adjacent a heating chamber containing at least one heating element in an oven compartment of a baker's oven, the at least one heating element chamber covering the at least one heating element, the at least one heating element chamber separated from the covered steam generation chamber by a dividing wall, the covered steam generation chamber being closed at one end, having at least one steam outlet at or adjacent the other end;

introducing a controlled volume of water into the covered steam generation chamber onto at least one heat sink member located in the covered steam generation chamber, the controlled volume of water being introduced at or adjacent the one end of the covered steam generator chamber;

converting the water into steam within the steam generation chamber and releasing the steam from the covered steam generation chamber through the steam outlet into the oven compartment.

14. The method of claim 13, wherein the introduction of water into the steam generation chamber does not result in a drop in the internal temperature of the oven compartment of more than 10° C.

15. The method of claim 13, wherein the steam is introduced into the oven compartment from the steam generation chamber towards the rear of the oven compartment.

16. The method of claim 13, wherein all of the steaming water is converted to steam by heat from the ballast bar before the water has travelled three quarters of the length of the steam generation chamber.

17. The steaming device of claim 1, wherein the steam outlet from the steam generation chamber is positioned towards the rear of the oven.

18. The baker's oven of claim 6, wherein the steam outlet of the steam generation chamber is positioned toward the rear of the oven and directs steam towards the rear wall of the oven compartment.

19. The method of claim 13, wherein the steam outlet from the steam generation chamber is directed towards the rear of the oven compartment.

* * * * *

UNITED STATES PATENT AND TRADEMARK OFFICE
CERTIFICATE OF CORRECTION

PATENT NO. : 7,985,944 B2  Page 1 of 1
APPLICATION NO. : 10/567417
DATED : July 26, 2011
INVENTOR(S) : P. E. Willett It is certified that error appears in the above-identified patent and that said Letters Patent is hereby corrected as shown below:

ERROR

On the Title page
Item (57)    Abstract      "chamber 55)" should read --chamber (55)--
             8 of text Column 5     line 66       "a elongate" should read --an elongate--
(Claim 2)

Column 6     line 43       "a elongate" should read --an elongate--
(Claim 9)

Signed and Sealed this
Fifteenth Day of November, 2011

David J. Kappos
*Director of the United States Patent and Trademark Office*